United States Patent
Sadek et al.

(10) Patent No.: US 9,253,658 B2
(45) Date of Patent: Feb. 2, 2016

(54) MANAGEMENT OF UNCOORDINATED INTERFERENCE

(71) Applicant: QUALCOMM Incorporated, San Diego, CA (US)

(72) Inventors: Ahmed Kamel Sadek, San Diego, CA (US); Tamer Adel Kadous, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 294 days.

(21) Appl. No.: 13/951,241

(22) Filed: Jul. 25, 2013

(65) Prior Publication Data

US 2014/0036805 A1  Feb. 6, 2014

Related U.S. Application Data

(60) Provisional application No. 61/678,601, filed on Aug. 1, 2012.

(51) Int. Cl.

| | |
|---|---|
| *H04W 4/00* | (2009.01) |
| *H04W 24/02* | (2009.01) |
| *H04W 52/36* | (2009.01) |
| *H04J 11/00* | (2006.01) |
| *H04W 72/08* | (2009.01) |
| *H04W 24/10* | (2009.01) |
| *H04L 5/00* | (2006.01) |
| *H04L 25/02* | (2006.01) |
| *H04L 25/03* | (2006.01) |

(52) U.S. Cl.
CPC ........... *H04W 24/02* (2013.01); *H04J 11/0056* (2013.01); *H04W 52/367* (2013.01); *H04W 72/082* (2013.01); *H04L 5/0048* (2013.01); *H04L 25/0204* (2013.01); *H04L 25/03898* (2013.01); *H04W 24/10* (2013.01)

(58) Field of Classification Search
CPC ...................................................... H04W 24/02
USPC .................................................. 370/329, 334
See application file for complete search history.

(56) References Cited

U.S. PATENT DOCUMENTS

| | | |
|---|---|---|
| 2009/0059851 A1 | 3/2009 | Weil et al. |
| 2011/0021153 A1 | 1/2011 | Safavi |
| 2012/0281563 A1 | 11/2012 | Comsa et al. |

(Continued)

FOREIGN PATENT DOCUMENTS

| | | |
|---|---|---|
| WO | 2011006116 A1 | 1/2011 |
| WO | 2011119750 A1 | 9/2011 |

(Continued)

OTHER PUBLICATIONS

International Search Report and Written Opinion—PCT/US2013/052260—ISA/EPO—Jan. 22, 2014.

*Primary Examiner* — Farah Faroul
(74) *Attorney, Agent, or Firm* — Seyfarth Shaw LLP

(57) ABSTRACT

An interference management scheme may detect a level of uncoordinated interference and compare a detected uncoordinated interference level against an intra-RAT (radio access technology) interference. Intra-RAT interference management algorithms or intra-RAT interference solutions are not triggered/applied if the uncoordinated interference is dominant. Alternatively, intra-RAT interference management algorithms may be triggered if co-channel intra-RAT interference is dominant.

18 Claims, 12 Drawing Sheets

(56) References Cited

U.S. PATENT DOCUMENTS

| | | | |
|---|---|---|---|
| 2013/0094387 A1* | 4/2013 | Susitaival et al. | 370/252 |
| 2014/0126483 A1* | 5/2014 | Novak et al. | 370/329 |
| 2014/0153452 A1* | 6/2014 | Son et al. | 370/280 |
| 2014/0315561 A1* | 10/2014 | Hooli et al. | 455/450 |
| 2015/0063139 A1* | 3/2015 | Zhang et al. | 370/252 |

FOREIGN PATENT DOCUMENTS

| | | |
|---|---|---|
| WO | 2012061765 A1 | 5/2012 |
| WO | 2013043003 A1 | 3/2013 |

\* cited by examiner

MANAGEMENT OF UNCOORDINATED INTERFERENCE

CROSS-REFERENCE TO RELATED APPLICATION

This application claims the benefit under 35 U.S.C. §119(e) to U.S. Provisional Patent Application No. 61/678,601, entitled, MANAGEMENT OF UNCOORDINATED INTERFERENCE, filed on Aug. 1, 2012, in the names of SADEK, et al., the disclosure of which is expressly incorporated by reference herein in its entirety.

BACKGROUND

1. Field

Aspects of the present disclosure relate generally to wireless communication systems, and more particularly to managing inter-RAT and intra-RAT interference in a small cell deployment 2. Background Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

According to one aspect of the present disclosure, a method for wireless communication includes detecting a level of uncoordinated interference. The method may also include detecting a level of intra-RAT (radio access technology) interference. The method may also include implementing an intra-RAT interference solution based at least in part on the level of uncoordinated interference and/or the level of intra-RAT interference.

According to another aspect of the present disclosure, an apparatus for wireless communication includes means for detecting a level of uncoordinated interference. The apparatus may also include means for detecting a level of intra-RAT (radio access technology) interference. The apparatus may also include means for implementing an intra-RAT interference solution based at least in part on the level of uncoordinated interference and/or the level of intra-RAT interference.

According to one aspect of the present disclosure, a computer program product for wireless communication in a wireless network includes a computer readable medium having non-transitory program code recorded thereon. The program code includes program code to detect a level of uncoordinated interference. The program code also includes program code to detect a level of intra-RAT (radio access technology) interference. The program code also includes program code to implement an intra-RAT interference solution based at least in part on the level of uncoordinated interference and/or the level of intra-RAT interference.

According to one aspect of the present disclosure, an apparatus for wireless communication includes a memory and a processor(s) coupled to the memory. The processor(s) is configured to detect a level of uncoordinated interference. The processor(s) is further configured to detect a level of intra-RAT (radio access technology) interference. The processor(s) is further configured to implement an intra-RAT interference solution based at least in part on the level of uncoordinated interference and/or the level of intra-RAT interference.

Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

Figure 1:
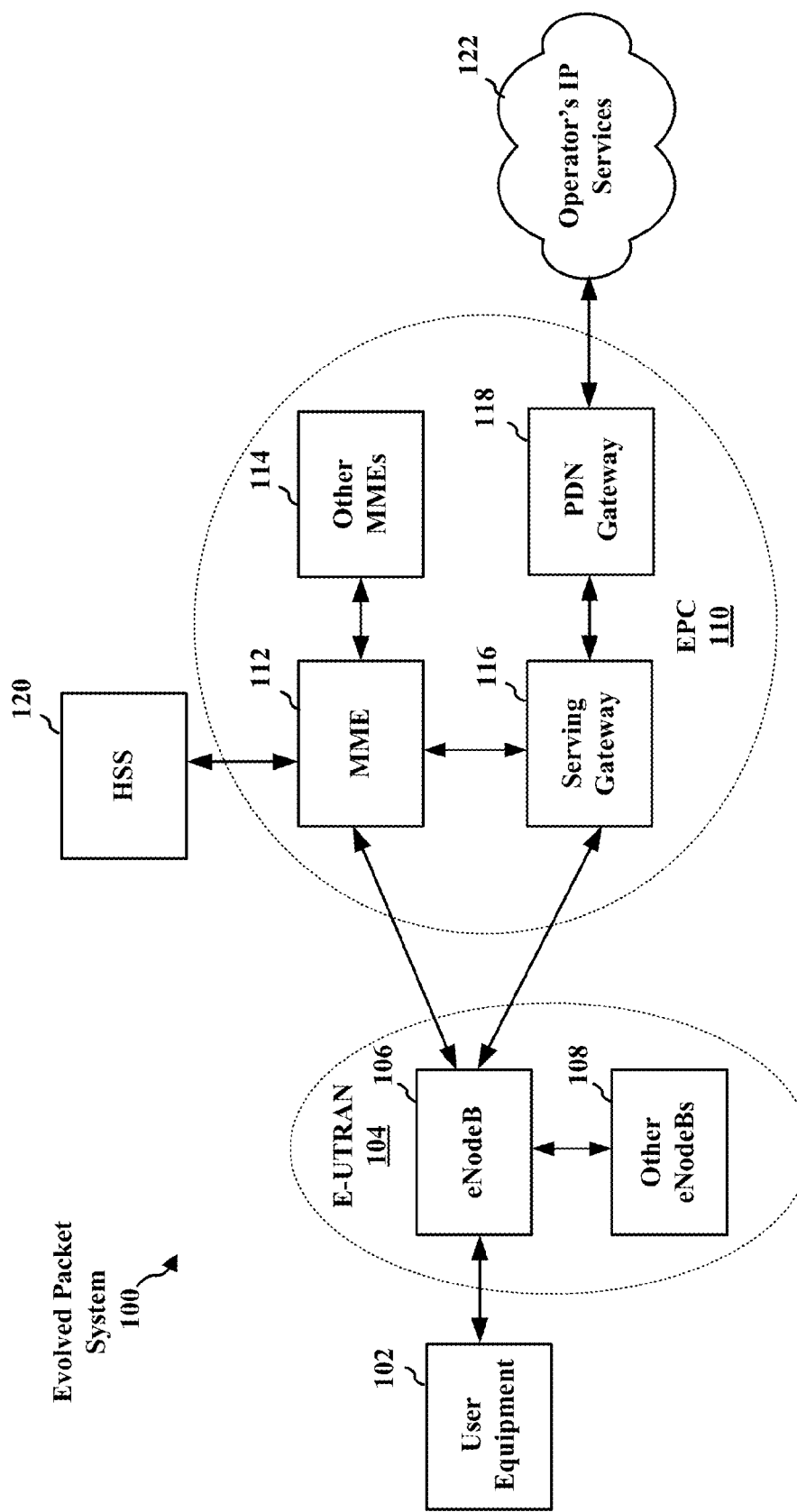
FIG. 1 is a diagram illustrating an example of a network architecture.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Aspects of the telecommunication systems are presented with reference to various apparatus and methods. These apparatus and methods are described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, a Home Subscriber Server (HSS) 120, and an Operator's IP Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNodeB) 106 and other eNodeBs 108. The eNodeB 106 provides user and control plane protocol terminations toward the UE 102. The eNodeB 106 may be connected to the other eNodeBs 108 via a backhaul (e.g., an X2 interface). The eNodeB 106 may also be referred to as a base station, a base transceiver station, a radio base station, a radio transceiver, a transceiver function, a basic service set (BSS), an extended service set (ESS), or some other suitable terminology. The eNodeB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNodeB 106 is connected to the EPC 110 via, e.g., an S1 interface. The EPC 110 includes a Mobility Management Entity (MME) 112, other MMEs 114, a Serving Gateway 116, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 may include the Internet, the Intranet, an IP Multimedia Subsystem (IMS), and a PS Streaming Service (PSS).

Figure 2:
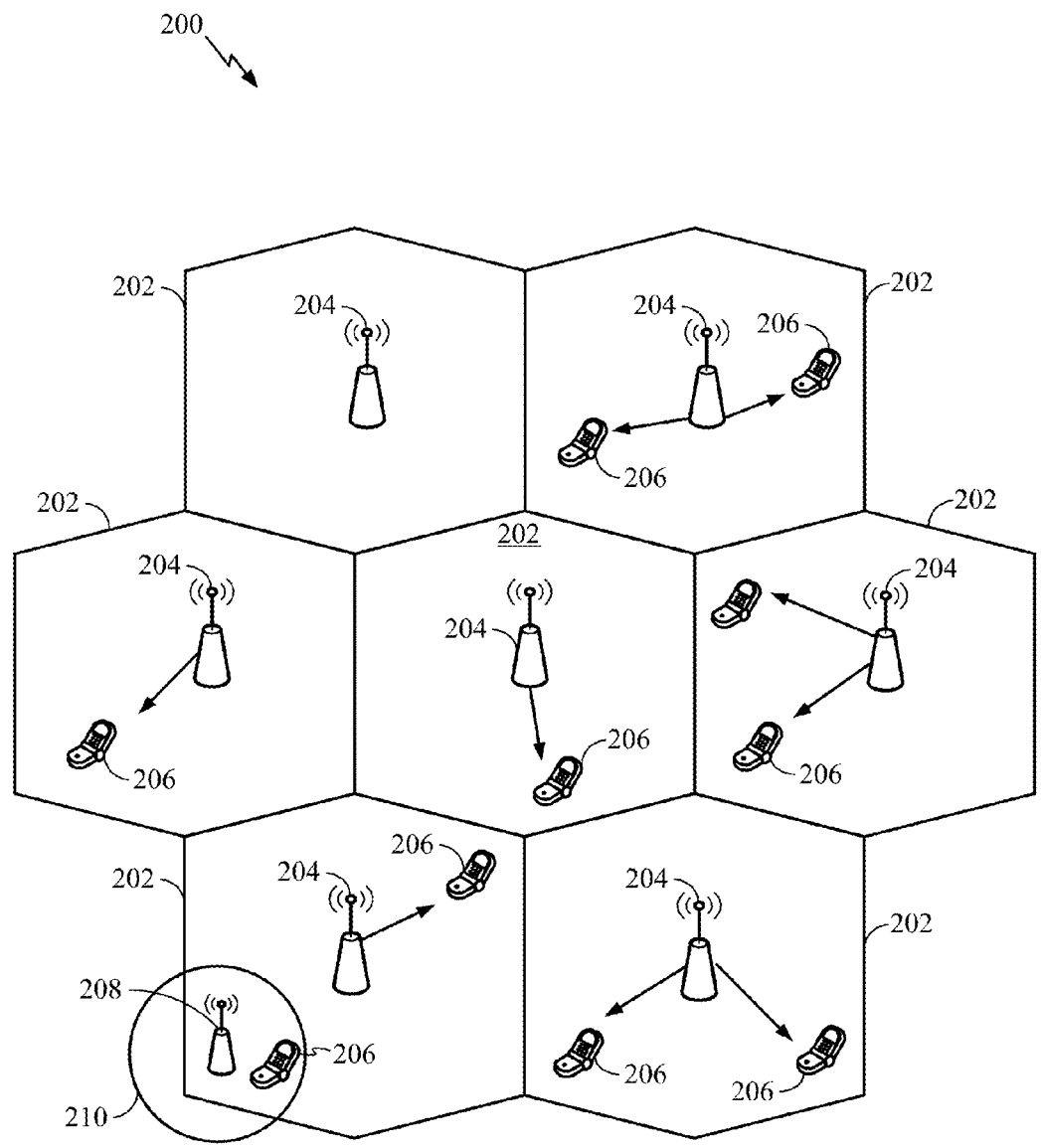
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNodeBs 208 may have cellular regions 210 that overlap with one or more of the cells 202. The lower power class eNodeB 208 may be a remote radio head (RRH), a femto cell (e.g., home eNodeB (HeNodeB)), pico cell, or micro cell. The macro eNodeBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNodeBs 204 are responsible for all radio related functions including radio bearer control, admission control, mobility control, scheduling, security, and connectivity to the serving gateway 116.

The modulation and multiple access scheme employed by the access network 200 may vary depending on the particular telecommunications standard being deployed. In LTE applications, OFDM is used on the downlink and SC-FDMA is used on the uplink to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNodeBs 204 may have multiple antennas supporting MIMO technology. The use of MIMO technology enables the eNodeBs 204 to exploit the spatial domain to support spatial multiplexing, beamforming, and transmit diversity. Spatial multiplexing may be used to transmit different streams of data simultaneously on the same frequency. The data steams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the downlink. The spatially precoded data streams arrive at the UE(s) 206 with different spatial signatures, which enables each of the UE(s) 206 to recover the one or more data streams destined for that UE 206. On the uplink, each UE 206 transmits a spatially precoded data stream, which enables the eNodeB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the downlink. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The uplink may use SC-FDMA in the form of a DFT-spread OFDM signal to compensate for high peak-to-average power ratio (PAPR).

Figure 3:
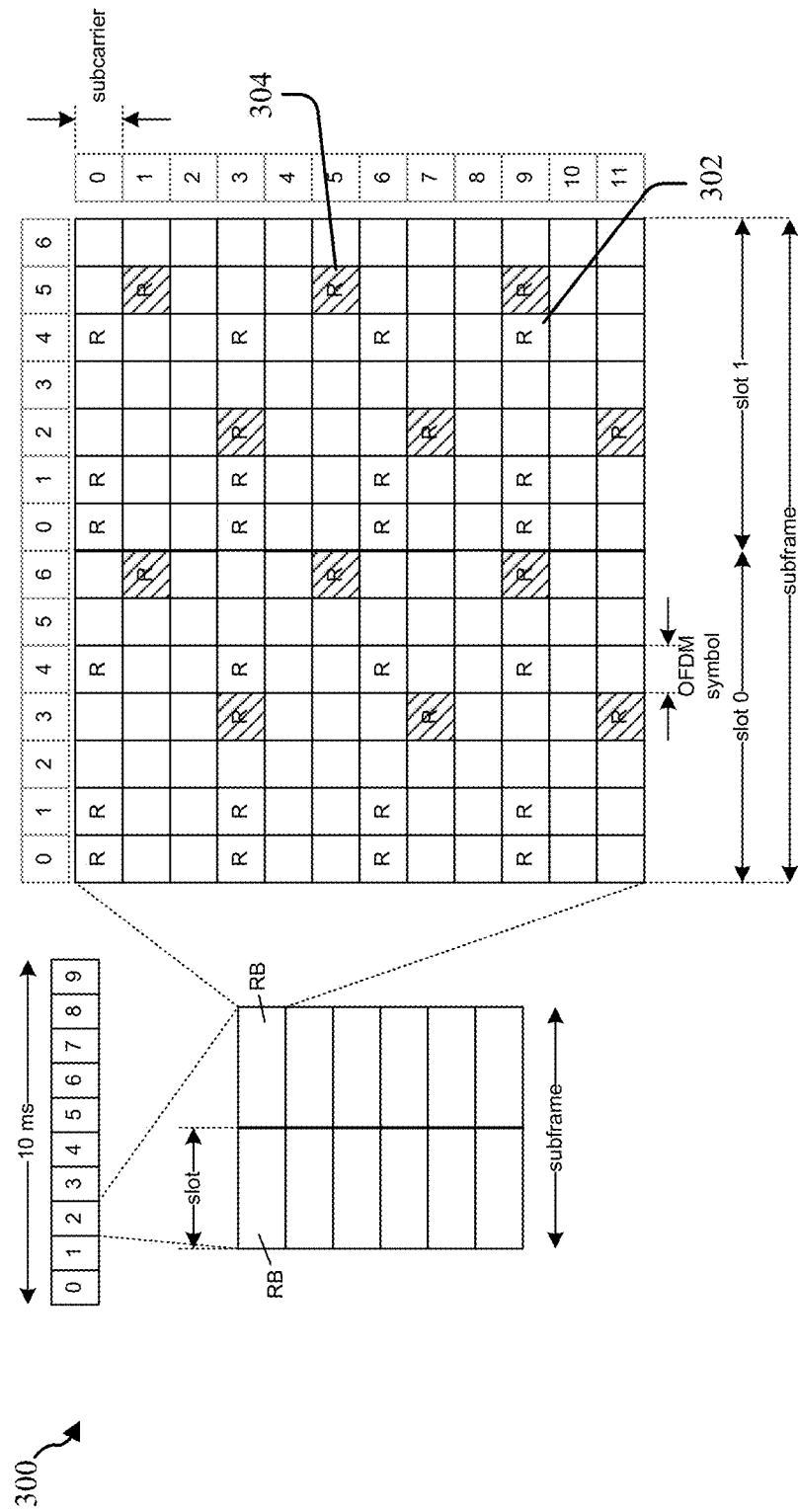
FIG. 3 is a diagram illustrating an example of a downlink frame structure in LTE.

FIG. 3 is a diagram 300 illustrating an example of a downlink frame structure in LTE. A frame (10 ms) may be divided into 10 equally sized sub-frames. Each sub-frame may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. For an extended cyclic prefix, a resource block contains 6 consecutive OFDM symbols in the time domain and has 72 resource elements. Some of the resource elements, as indicated as R 302, 304, include downlink reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical downlink shared channel (PDSCH) is mapped. The number of bits carried by each resource element depends on the modulation scheme. Thus, the more resource blocks that a UE receives and the higher the modulation scheme, the higher the data rate for the UE.

Figure 4:
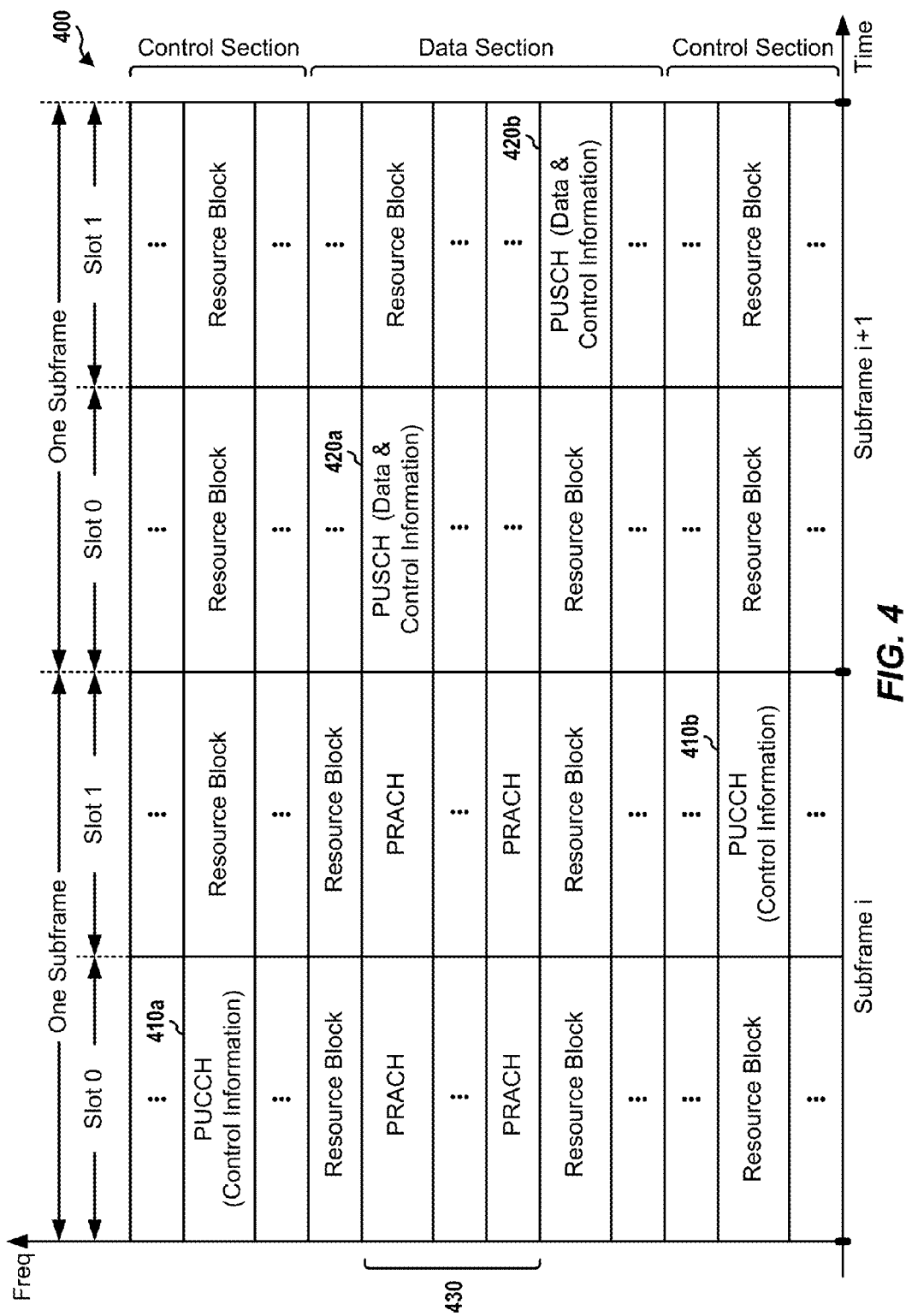
FIG. 4 is a diagram illustrating an example of an uplink frame structure in LTE.

FIG. 4 is a diagram 400 illustrating an example of an uplink frame structure in LTE. The available resource blocks for the uplink may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The uplink frame structure results in the data section including contiguous subcarriers, which may allow a single UE to be assigned all of the contiguous subcarriers in the data section.

A UE may be assigned resource blocks 410a, 410b in the control section to transmit control information to an eNodeB. The UE may also be assigned resource blocks 420a, 420b in the data section to transmit data to the eNodeB. The UE may transmit control information in a physical uplink control channel (PUCCH) on the assigned resource blocks in the control section. The UE may transmit only data or both data and control information in a physical uplink shared channel (PUSCH) on the assigned resource blocks in the data section. An uplink transmission may span both slots of a subframe and may hop across frequency.

A set of resource blocks may be used to perform initial system access and achieve uplink synchronization in a physical random access channel (PRACH) 430. The PRACH 430 carries a random sequence and cannot carry any uplink data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
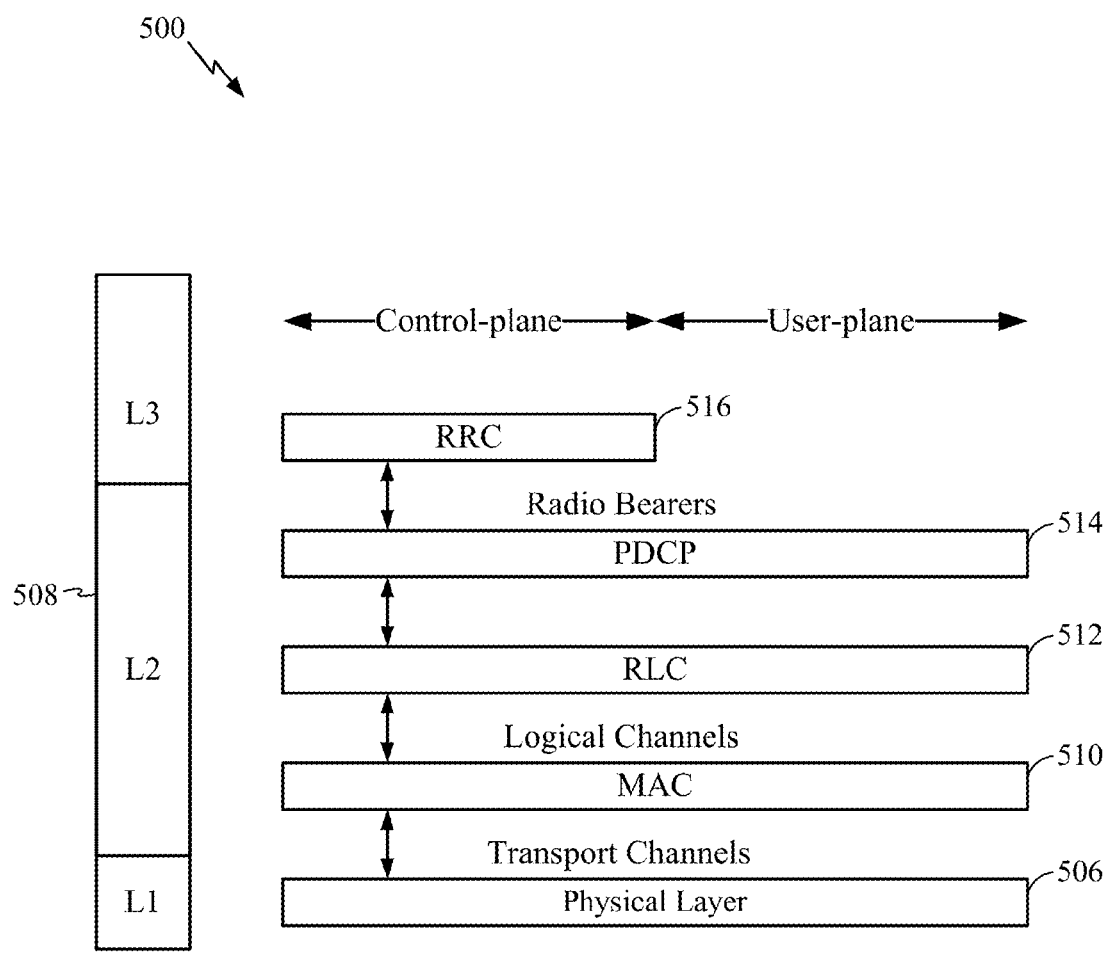
FIG. 5 is a diagram illustrating an example of a radio protocol architecture for the user and control plane.

FIG. 5 is a diagram 500 illustrating an example of a radio protocol architecture for the user and control planes in LTE. The radio protocol architecture for the UE and the eNodeB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNodeB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNodeB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNodeBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNodeB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (i.e., radio bearers) and for configuring the lower layers using RRC signaling between the eNodeB and the UE.

Figure 6:
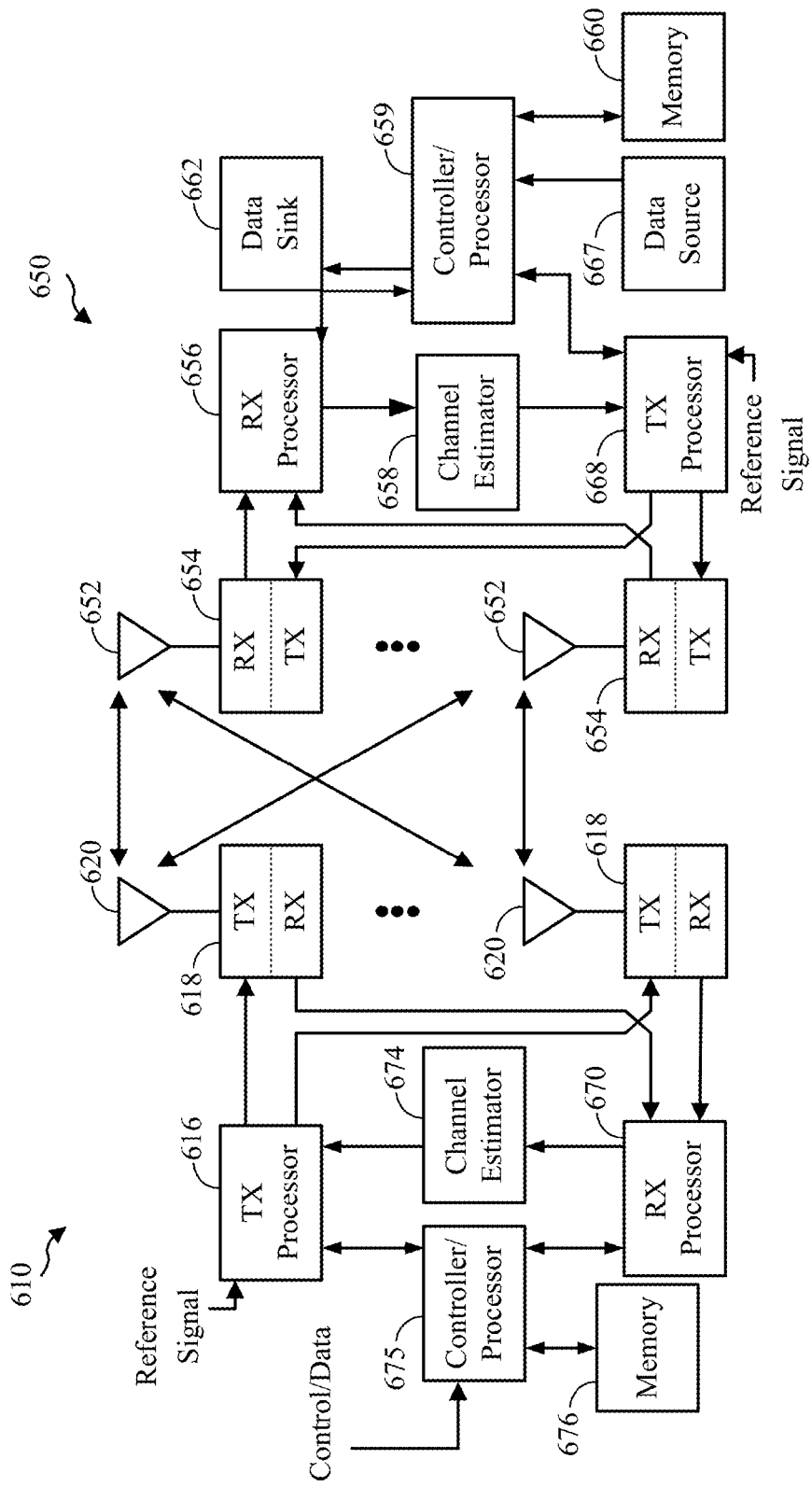
FIG. 6 is a diagram illustrating an example of an evolved Node B and user equipment in an access network.

FIG. 6 is a block diagram of an eNodeB 610 in communication with a UE 650 in an access network. In the downlink, upper layer packets from the core network are provided to a controller/processor 675. The controller/processor 675 implements the functionality of the L2 layer. In the downlink, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The TX processor 616 implements various signal processing functions for the L1 layer (i.e., physical layer). The signal processing functions includes coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream is then provided to a different antenna 620 via a separate transmitter 618TX. Each transmitter 618TX modulates an RF carrier with a respective spatial stream for transmission.

At the UE 650, each receiver 654RX receives a signal through its respective antenna 652. Each receiver 654RX recovers information modulated onto an RF carrier and provides the information to the receiver (RX) processor 656. The RX processor 656 implements various signal processing functions of the L1 layer. The RX processor 656 performs spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNodeB 610. These soft decisions may be based on channel estimates computed by the channel estimator 658. The soft decisions are then decoded and deinterleaved to recover the data and control signals that were originally transmitted by the eNodeB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the uplink, the control/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the uplink, a data source 667 is used to provide upper layer packets to the controller/processor 659. The data source 667 represents all protocol layers above the L2 layer. Similar to the functionality described in connection with the downlink transmission by the eNodeB 610, the controller/processor 659 implements the L2 layer for the user plane and the control plane by providing header compression, ciphering, packet segmentation and reordering, and multiplexing between logical and transport channels based on radio resource allocations by the eNodeB 610. The controller/processor 659 is also responsible for HARQ operations, retransmission of lost packets, and signaling to the eNodeB 610.

Channel estimates derived by a channel estimator 658 from a reference signal or feedback transmitted by the eNodeB 610 may be used by the TX processor 668 to select the appropriate coding and modulation schemes, and to facilitate spatial processing. The spatial streams generated by the TX processor 668 are provided to different antenna 652 via separate transmitters 654TX. Each transmitter 654TX modulates an RF carrier with a respective spatial stream for transmission.

The uplink transmission is processed at the eNodeB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

Figure 7:
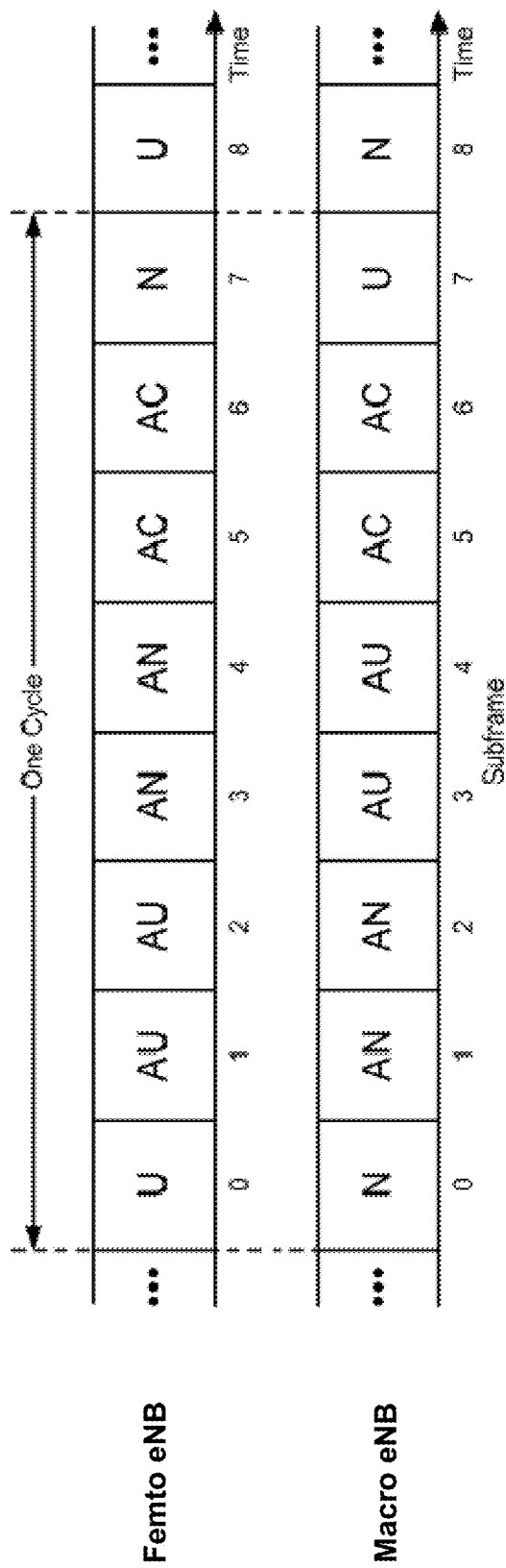
FIG. 7 is a block diagram conceptually illustrating adaptive resource partitioning in a heterogeneous network according to one aspect of the disclosure.

The controller/processor 675 implements the L2 layer. The controller/processor 675 can be associated with a memory 676 that stores program codes and data. The memory 676 may be referred to as a computer-readable medium. In the uplink, the control/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations FIG. 7 is a block diagram illustrating TDM partitioning in a heterogeneous network according to one aspect of the disclosure. A first row of blocks illustrate sub frame assignments for a femto eNodeB, and a second row of blocks illustrate sub frame assignments for a macro eNodeB. Each of the eNodeBs has a static protected sub frame during which the other eNodeB has a static prohibited sub frame. For example, the femto eNodeB has a protected sub frame (U sub frame) in sub frame 0 corresponding to a prohibited sub frame (N sub frame) in sub frame 0. Likewise, the macro eNodeB has a protected sub frame (U sub frame) in sub frame 7 corresponding to a prohibited sub frame (N sub frame) in sub frame 7. Sub frames 1-6 are dynamically assigned as either protected sub frames (AU), prohibited sub frames (AN), and common sub frames (AC). The dynamically assigned subframes (AU/AN/AC) are referred to herein collectively as "X" subframes. During the dynamically assigned common sub frames (AC) in sub frames 5 and 6, both the femto eNodeB and the macro eNodeB may transmit data.

Protected sub frames (such as U/AU sub frames) have reduced interference and a high channel quality because aggressor eNodeBs are prohibited from transmitting. Prohibited sub frames (such as N/AN sub frames) have no data transmission to allow victim eNodeBs to transmit data with low interference levels. Common sub frames (such as C/AC sub frames) have a channel quality dependent on the number of neighbor eNodeBs transmitting data. For example, if neighbor eNodeBs are transmitting data on the common sub frames, the channel quality of the common sub frames may be lower than the protected sub frames. Channel quality on common sub frames may also be lower for cell range expansion (CRE) UEs strongly affected by aggressor eNodeBs. A CRE UE may belong to a first eNodeB but also be located in the coverage area of a second eNodeB. For example, a UE communicating with a macro eNodeB that is near the range limit of a femto eNodeB coverage is a CRE UE.

Figure 8:
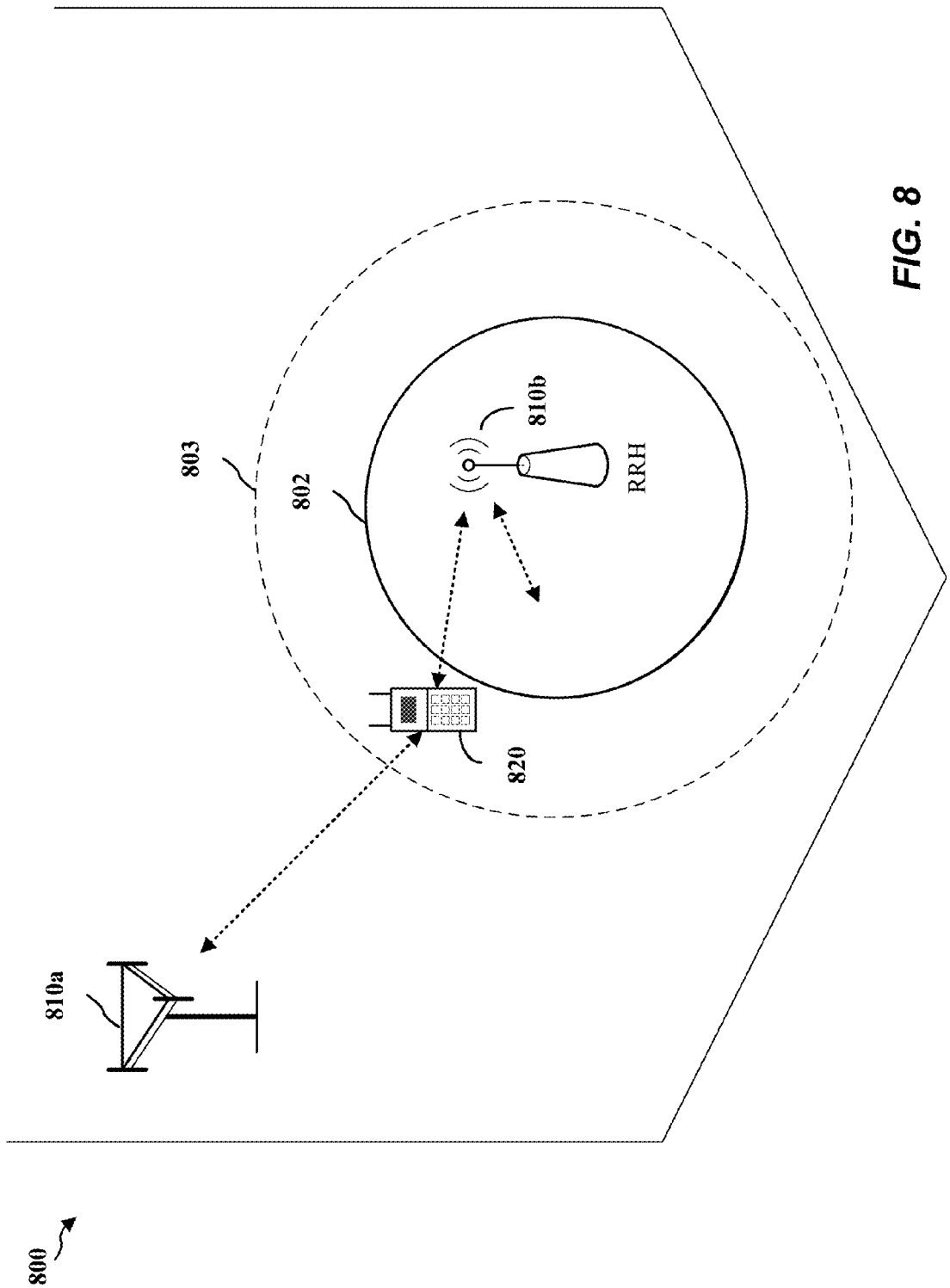
FIG. 8 is a diagram illustrating a range expanded cellular region in a heterogeneous network.

FIG. 8 is a diagram illustrating a CRE region in a heterogeneous network. A lower power class eNodeB such as the remote radio head (RRH) 810B may have a CRE region 803 that is expanded from the cellular region 802 through enhanced inter-cell interference coordination between the RRH 810B and the macro eNodeB 810A and through interference cancelation performed by the UE 820. In enhanced inter-cell interference coordination, the RRH 810B receives information from the macro eNodeB 810A regarding an interference condition of the UE 820. The information allows the RRH 810B to serve the UE 820 in the CRE region 803 and to accept a handoff of the UE 820 from the macro eNodeB 810A as the UE 820 enters the CRE region 803.

Interference Management During Uncoordinated Interference

In some systems, a first base station (e.g., access point or eNodeB) may utilize an interference management method to mitigate co-channel interference from nodes within the same network. The first base station may experience uplink interference from a neighboring wireless device, such as a second base station or a device connected to the second base station. The second base station may be the same radio access technology (RAT) as the first base station or may be a different RAT. Furthermore, the second base station may be operating on the same channel as the first base station or on an adjacent channel.

For example, the second base station may be a source of potential uplink interference when the first and second base stations are operating on the same channel in an unlicensed spectrum. As another example, the second base station may be a source of potential uplink interference when the second base station is operating with a limited guard band on a channel that is adjacent to a channel of the first base station. The latter example may be similar to a cross device problem.

Some systems may utilize an interference avoidance scheme, such as the scheme utilized in 802.11 systems. The interference avoidance scheme may utilize a TDM scheme or FDM scheme. In a TDM scheme only one pair (e.g., base station and receiver) are communicating during each time slot. This scheme may also be utilized in a heterogeneous network (hetnet) system (ABS pattern) to avoid strong jammers, as discussed above. Other systems may utilize a soft-avoidance scheme, such as an adaptive power backoff.

Generally, a baseline interference management method may be used to manage intra-RAT co-channel interference (e.g., interference generated from nodes belonging to the same network). However, in the presence of uncoordinated interference, an interference management method may not be able to determine if the interference is intra-RAT (e.g., same network) interference or inter-RAT interference (e.g., uncoordinated interference). Accordingly, if the interference management method cannot accurately determine the source of the interference, then false positives may decrease the network performance due to an unnecessary transmission power reduction or an unnecessary backoff to this uncoordinated interference.

In the present disclosure, intra-RAT interference may refer to co-channel intra-RAT interference and co-channel neighbor cell interference. For example, a second wireless device (e.g., aggressor wireless device) may be a source of intra-RAT interference when the aggressor wireless device and the victim wireless device are operating on the same channel in a licensed spectrum.

Furthermore, inter-RAT interference may refer to interference caused from an aggressor wireless device that is operating on a different channel from the victim wireless device. Alternatively, inter-RAT interference may refer to interference caused from an aggressor wireless device that is operating on a same channel from the victim wireless device in an unlicensed spectrum.

For example, the second base station may be a source of potential uplink interference when the first and second base stations are operating on the same channel in an unlicensed spectrum. As another example, the second base station may be a source of potential uplink interference when the second base station is operating with a limited guard band on a channel that is adjacent to a channel of the first base station. The latter example may be similar to a cross device problem.

According to some aspects, an interference management scheme may detect the level of the uncoordinated interference and compare the detected uncoordinated interference level against the intra-RAT interference. Intra-RAT interference management algorithms or intra-RAT interference solutions are not triggered/applied if the uncoordinated interference is dominant. Alternatively, intra-RAT interference management algorithms may be triggered if co-channel intra-RAT interference is dominant. The level of the un-coordinated interference can be a function of the interference level and/or duty cycle of the interference. Implementing the intra-RAT management techniques may include modifying the intra-RAT coexistence management, halting the intra-RAT coexistence management or initiating intra-RAT coexistence management.

According to some aspects, detection of the uncoordinated interference level may be based on a waveform of the uncoordinated interference source if the waveform of the other RAT is known. For example, if an aggressor/interfering RAT has a known pilot or preamble, the victim RAT may attempt to correlate with this preamble. According to other aspects, the detection may be based on a temporal or frequency domain pattern of the interference, such as known bandwidth or burst length.

According to still other aspects, the detection may be based on a measurement of a link quality metric with and without the intra-RAT interference. That is, a UE j may detect whether the interference is dominated by inter-RAT (e.g. adjacent channel interference) or intra-RAT interference by calculating the link quality metric. According to the present aspect, the link quality metric may be calculated by subtracting a bad signal metric, for example signal to interference plus noise ratio, (SINRb) from a good signal metric (SINRg). That is, SINRg is the SINR without the intra-RAT interference and SINRb is the SINR with the intra-RAT interference.

If the difference between link quality metrics is greater than a threshold, then intra-RAT interference may be considered dominant and the UE may send requests to aggressor access points from the same network to reduce their transmission power (e.g., backoff), as described in more detail below. Otherwise, if the difference between metrics is less than a threshold (i.e., the values are sufficiently similar), then inter-RAT interference is dominant and the UE may select an appropriate interference mitigation scheme.

That is, the UE may not send an interference mitigation request to the intra-RAT access point because this will cause unnecessary loss of neighbor cell resources and it will not help the UE if the inter-RAT interference is dominant. Alternatively, the UE may adjust the allowable interference threshold (see Equation 1 below) based on the level of the inter-RAT interference. Accordingly, the UE makes a soft decision for handling interference when then inter-RAT interference is the dominant source of interference.

Although the present disclosure discloses determining a SINR as a link quality metric, the present disclosure contemplates other metrics to determine whether the interference is dominated by inter-RAT interference or intra-RAT interference.

When the intra-RAT interference is dominant, the UE may mitigate the interference based on aspects discussed below.

In a dense small cell deployment, the number of jammers may be greater than one. Accordingly, if the typical reuse 1 interference mitigation scheme is utilized, the interference level may increase as a result of the victim access points increasing their noise floors in response to the interference. That is, the typical reuse 1 scheme may impact the performance of the network as a result of increased interference caused by the increased noise floors.

Alternatively, utilizing the interference avoidance scheme may result in a loss in the degrees of freedom (DoF) due to the silencing of jammers. For example, a dense small cell only deployment may have ten pairs of users. A pair of users may be a cell (e.g., femto cell) and a user. In a typical deployment, all ten pairs may be simultaneously transmitting and receiving. Accordingly, as a result of the simultaneous transmission/reception of multiple pairs, the interference may increase and thereby impact the performance of the network. Under the interference avoidance scheme, only one pair may transmit at a given time slot. The interference avoidance systems may not be desirable for a small cell only deployment due to the loss of capacity resulting from only allowing one pair to transmit at a given time slot.

Provided below are interference management methods for mitigating interference in a small cell deployment. The aspects provided below utilize inter-node messaging for a downlink power reduction scheme (dynamic power control). The power reduction scheme may result in an increase in a signal to noise ratio (SINR) while limiting a drop in reuse.

According to one aspect, an interference mitigation scheme may cause aggressor access points (e.g., base stations or eNodeBs) to reduce their transmission (Tx) power according to an allowable interference level. The transmission power may be reduced for time slots when a victim user equipment (UE) (e.g., wireless device) is receiving a transmission and experiencing interference.

In order to reduce the transmission power, an access point may be informed of a link quality of a victim UE. According to one aspect, to inform the access point of the link quality, a victim UE may broadcast an interference message including an allowable interference level, the victim UEs priority, and frequency resources. The message may be broadcast at a known power level.

The allowable interference level is the level of interference that the victim UE may tolerate (absorb). For example, the victim UE may know that its desired signal power is −60 dBm and the victim device may handle up to −70 dBm of interference. The allowable interference level allows an aggressor to decide whether it should backoff and it also provides for flexibility in the power backoff. The priority refers to the UEs priority level. The priority may be based on, for example, the UEs desired throughput or quality of service (QoS). The frequency resources refer to the frequency resources and time durations of the frequency resources that may be used by the victim UE.

The interference message is broadcast from the UE if an event is triggered. That is, the interference message may only be transmitted when the UE experiences an event, such as increased interference. According to some aspects, the trigger may be an average throughput achieved at a specific instance, a comparison between a reference signal received power (RSRP) and a reference signal received quality (RSRQ), or a difference between a link quality with neighbor cell interference and a link quality without neighbor cell interference. The difference between a link quality with neighbor cell interference and a link quality without neighbor cell interference may be calculated by calculating a serving cell quality after cancelling the neighbor cell pilots and a total received signal strength indicator (RSSI).

An access point may listen to all interference messages transmitted in a time instance and compute the following equation from the interference messages:

$$\exists j : P - L_{kj} > I_{max,j} \quad (1)$$

That is, for every UE j that has broadcast the message, the access point k computes the interference level the access point k will cause at the victim UE j if the access point k transmits. The aforementioned interference level is calculated by subtracting the access point k transmission power P from the pathloss L between a victim UE j and the access point k ($L^{kj}$). The access point k may estimate the pathloss from the received signal strength indicator of the request received from the victim UE j.

The access point k then determines whether the computed interference $P-L_{kj}$ is greater than the allowable interference level ($I_{max,j}$) calculated by the UE j. The allowable interference level ($I^{max,j}$) is included in the interference message.

In addition to comparing the interference caused by the access point k ($P-L_{kj}$) to the allowable interference level ($I_{max,j}$), the access point k also determines if the priority (f(k)) is less than the priority(j). F(k) is the UE scheduled to be served by the access point k. The priority(x) refers to a priority level associated to a UE x. The priority level may represent a quality of service (QoS) metric as an average served throughput, a link quality, a required delay, a buffer size, or a combination thereof.

According to other aspects, the priority P may be determined based on equation 2.

$$P(j, n) = \frac{R_{g,j,n} - R_{b,j,n}}{T_{j,n}} > \gamma \quad (2)$$

In equation 2, the UE j calculates the priority P from the ratio of a good channel quality index (CQIg) and a bad channel quality index (CQIb) and the achieved throughput at time n. More specifically, $R_{g,j,n}$ is the spectral efficiency after cancelling NCell pilots (i.e. includes inter-RAT interference) and $R_{b,j,n}$: is the spectral efficiency including NCell interference. $T_{j,n}$ is the throughput of the UE j at time n. γ is a threshold that is compared to the metric for determining whether to send the request for the power backoff. The metric P(j,n) is similar to the UE priority described above, but this metric P(j,n) accounts for the inter-RAT interference.

The interference is dominated by intra-RAT co-channel interference if CQIg-CQIb is greater than a threshold. The UE throughput may be low due to cell loading, coverage, or inter-RAT interference if the CQIg-CQIb is less than a threshold.

Thus, according to some aspects, the access point may determine that it is an aggressor based on calculations from equation 1 and the priority (x). That is, the access point determines that it is an aggressor if the interference caused by the access point at the victim UE is greater than the allowable interference indicated by the victim UE and the victim UE has a priority that is greater than the priority of another UE scheduled at the time slot and associated with the aggressor access point.

Figure 9:
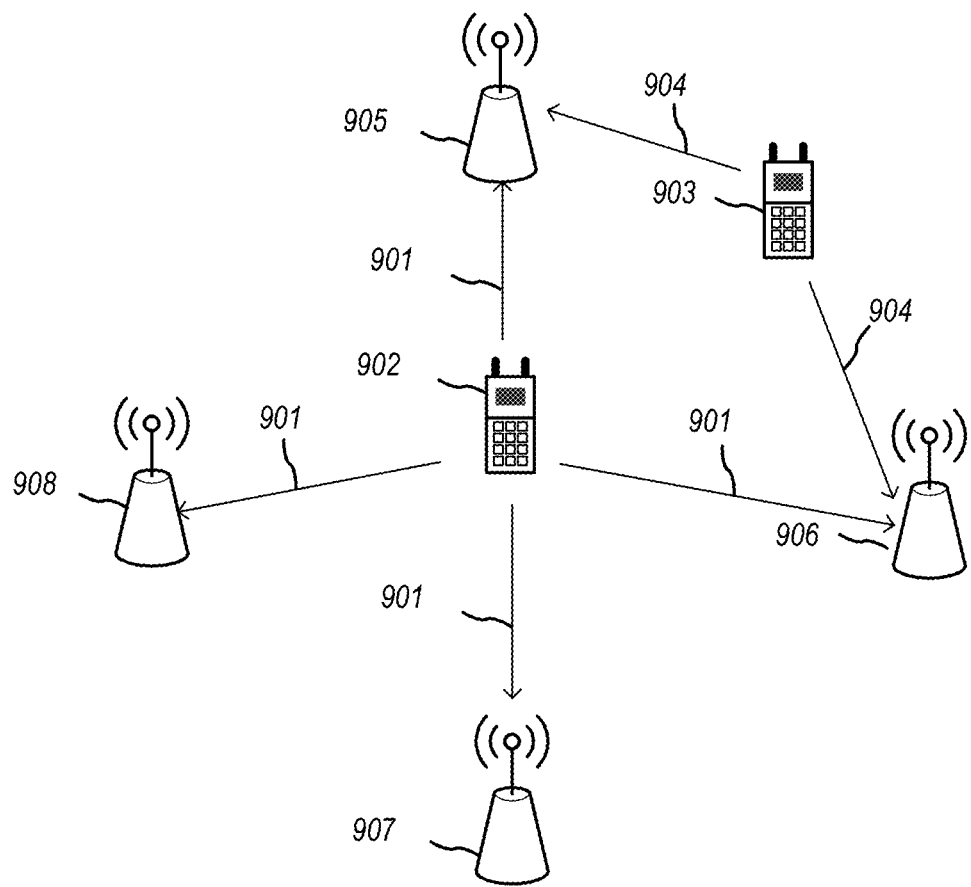
FIG. 9 is a block diagrams conceptually illustrating a small cell deployment according to aspects of the disclosure.

FIG. 9 illustrates an example of a victim UE broadcasting an interference message to the access points according to aspects of the present disclosure. As previously discussed, a first UE 902 may determine whether an event has been triggered, such as experiencing interference (not shown). The determination may be based on, for example, throughput, QoS, or comparing link quality with and without interference.

Upon determining that the event has been triggered, the first UE 902 may broadcast an interference message 901 to all of the access points 905-908 of the small cell deployment. Additionally, a second UE 903 may also be broadcasting an interference message 904 as a result of interference experienced at the second UE 903. Similar to the interference message 901 of the first UE 902, the interference message 904 of the second UE 903 may be broadcast to all of the access points 905-908 of the small cell only deployment, although access points 907-908 are out of range and thus do not receive the broadcast.

An access point 905 may receive the interference messages 901 and 904 and determine whether to adjust its transmission power based on equation 1 and the priority of each of the first UE 902 and second UE 903. When there is more than one victim UE, such as the example illustrated in FIG. 9, the aggressor access point 905 selects a new transmission power that generate less than the allowable interference level of all the victim UEs 902 903.

According to one aspect, the allowable interference level of equation 1 ($I_{max,j}$) may be calculated at the UE according to the following equation:

$$I_{max,j} = S_j = \Delta \quad (3)$$

In equation 3, $S_j$ is the received signal strength from the cell serving the UE j (e.g., the RSSI or RSRP of the serving cell) and Δ is the allowable interference. For example, if the received signal strength from the serving cell ($S_j$) is −70 dBm and Δ is 10 dBm, then the allowable interference level is −80 dBm. The allowable interference level calculated from equation 2 results in a fixed $SINR_b$.

According to another aspect, the allowable interference level is calculated based on the expected gain from the time division multiplexing (TDM). Specifically, the UE may compare a capacity based on equation 4 and select an allowable interference accordingly. Equation 4 is as follows:

$$n^* = \text{argmax} \frac{1}{n+1} \log_2(1 + SINR_n) \quad (4)$$

In equation 4, $SINR_n$ is the SINR when removing the first n dominant interferers. Furthermore, n* is the recommended number of interferers that should be removed. Based on equation 3, if n* equals zero, the allowable interference is 100% (e.g., TDM is not occurring). If n* equals one, the allowable interference is set to an interference level of the second dominant interferer. That is, the allowable interference is set to the level of the (n*+1) interferer.

According to some aspects, in responding to the broadcast message from the victim UE, the access point may calculate the backoff from the maximum transmission power to meet the lowest allowable interference. That is, the aggressor access point may calculate a new transmission power P' so that the new interference caused by the access point k ($P'-L_{kj}$) is less than the allowable interference level ($I_{max,j}$). If there is more than one victim UE, the aggressor access point should select a new transmission power P' that will be less than the allowable interference level of all the victim UEs. The transmission power backoff $\delta_k$ for the kth access point and may be calculated as follows:

$$\delta_k = \max_{j \in \Phi k}(P_{max} - L_{kj} - I_{max,j}) \quad (5)$$

In equation 5, $L_{kj}$ is the pathloss L between a victim UE j and the access point k, $I_{max,j}$ is the allowable interference level calculated by the UE j, and Φk is the set of victim UEs that have had their requests for a reduced transmission power accepted. Furthermore, if the maximum transmission power backoff $\delta_k$ equals zero, then the access point responds by initiating a TDM scheme, i.e., full power back off (avoidance). Otherwise, the access point k reduces its transmission power by the amount $\delta_k$.

After reducing the transmission power, the access point selects a UE with good geometry (high signal to interference plus noise ratio (SINR)) to determine whether the backoff was effective. That is, after reducing its transmission power, the access point would select a UE that it can serve with the reduced power to determine effectiveness of the power reduction. The UE with good geometry may be the UE with the best link condition (highest signal to interference plus noise ratio), or a metric that combines the high signal to interference plus noise ratio and desired quality of service for the associated UEs. The UE with good geometry is selected because a poor UE, (e.g., a UE at a cell edge) may have a signal that would not improve even with the reduced transmission power.

Figure 10:
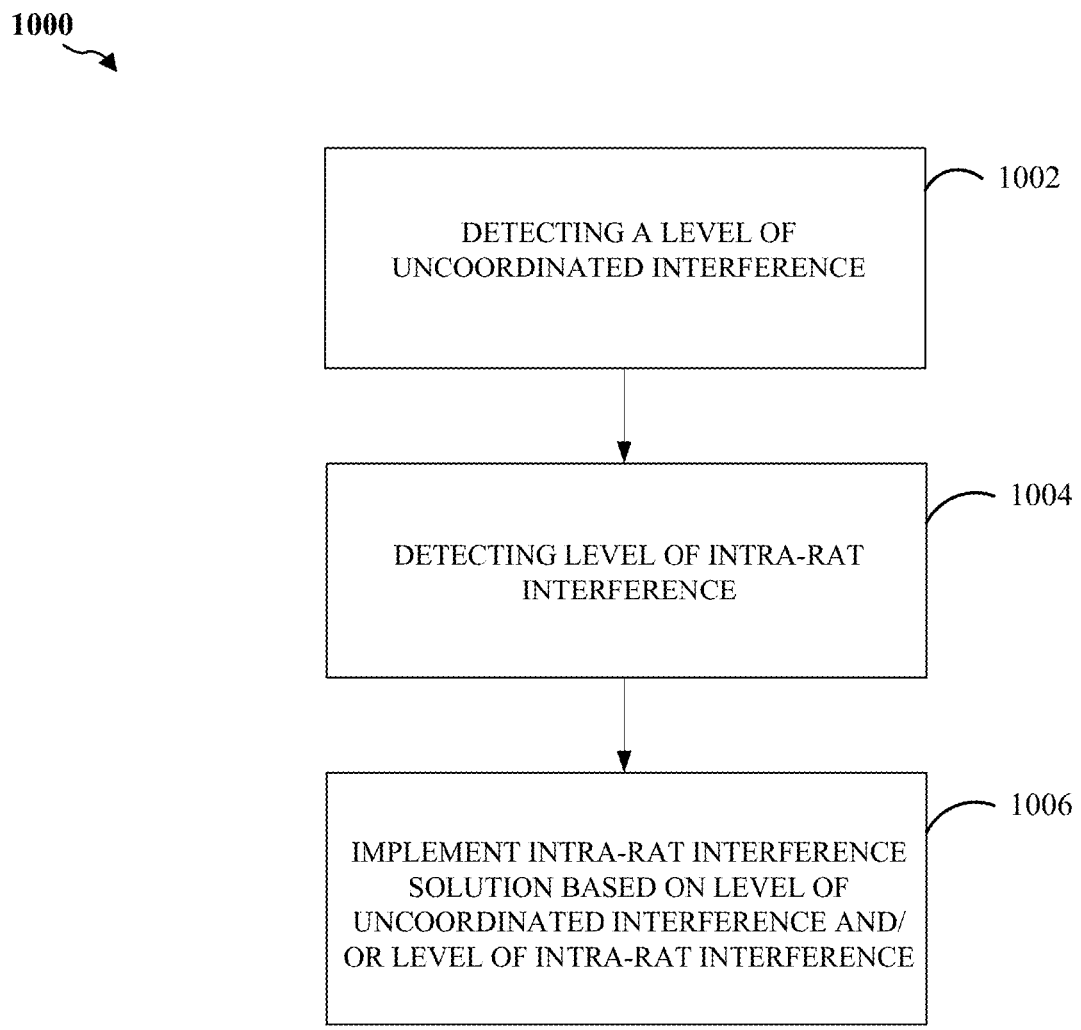
FIG. 10 is a block diagram illustrating a method for managing interference in a small cell deployment.

FIG. 10 illustrates a method 1000 for wireless communication. In block 1002, a UE and/or base station detects a level of uncoordinated interference. The UE detects a level of intra-RAT interference, in block 1004. In block 1006, the UE implements an intra-RAT interference solution based at least in part on the level of uncoordinated interference and/or the level of intra-RAT interference.

Figure 11:
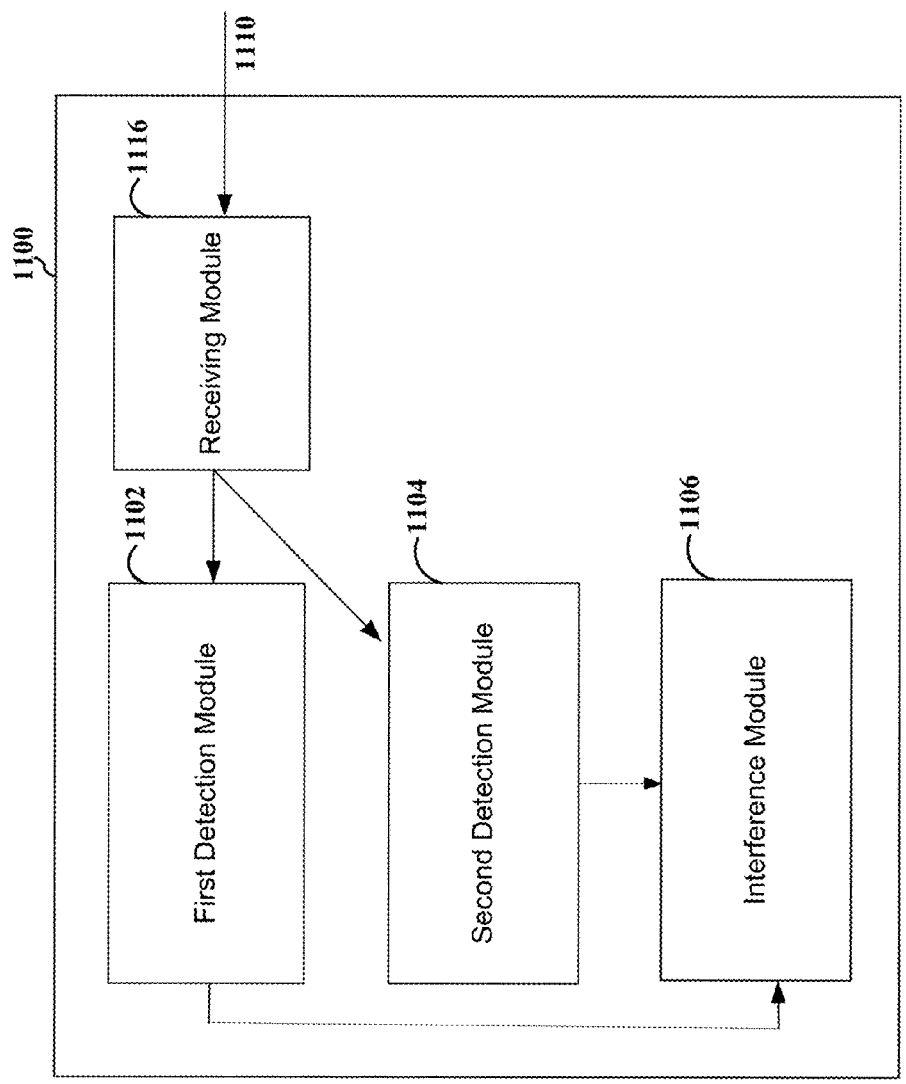
FIG. 11 is a conceptual data flow diagram illustrating the data flow between different modules/means/components in an exemplary apparatus.

FIG. 11 is a conceptual data flow diagram illustrating an exemplary data flow between different modules/means/components in an exemplary apparatus 1100. The apparatus 1100 includes a first detection module 1102 that detects a level of uncoordinated interference, a second detection module 1104 that detects a level of intra-RAT interference, and an interference module 1106 that implements an intra-RAT interference solution based at least in part on the level of uncoordinated interference and/or the level of intra-RAT interference. The apparatus may include additional modules that perform each of the steps of the process in the aforementioned flow charts.

In some aspects, the first detection module 1102 may detect a level of uncoordinated interference based at least in part on a waveform of an interfering RAT or from temporal or frequency domain pattern of the interference. The waveform and/or the temporal or frequency domain pattern may be determined from signals 1110 received at the receiving module 1116. Furthermore, the second detection module 1104 may detect a level of intra-RAT interference based on signals 1110 received at the receiving module 1116. The first detection module 1102 and the second detection module 1104 may transmit the uncoordinated interference and the intra-RAT interference to the interference module 1106 so that the initiation module may implement an intra-RAT interference solution based at least in part on the level of uncoordinated interference and/or the level of intra-RAT interference.

As such, each step in the aforementioned flow charts may be performed by a module and the apparatus may include one or more of those modules. The modules may be one or more hardware components specifically configured to carry out the stated processes, implemented by a processor configured to perform the stated processes, stored within a computer-readable medium for implementation by a processor, or some combination thereof.

Figure 12:
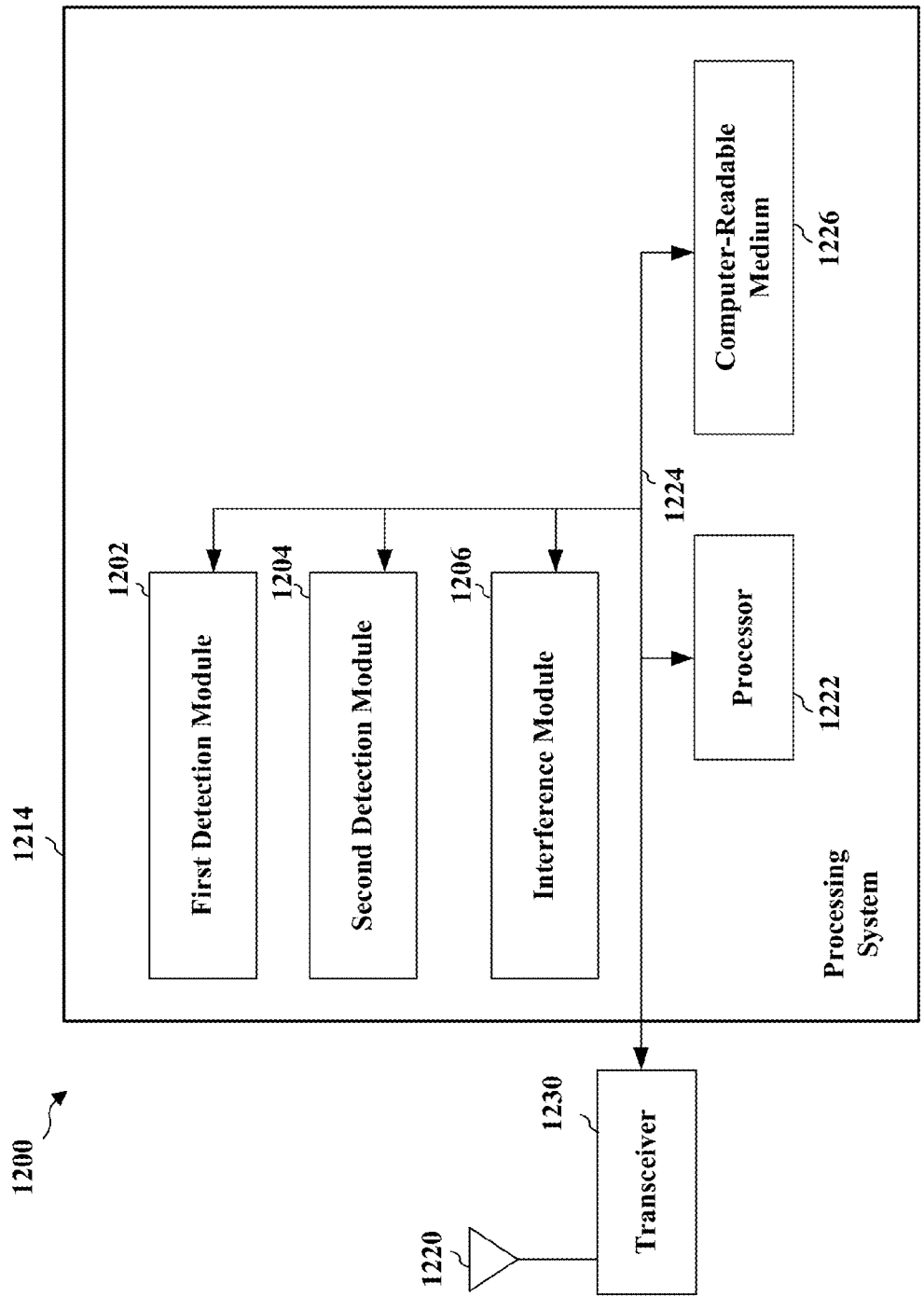
FIG. 12 is a block diagram illustrating the data flow between different modules/means/components in an exemplary apparatus.

FIG. 12 is a diagram illustrating an example of a hardware implementation for an apparatus 1200 employing a processing system 1214. The processing system 1214 may be implemented with a bus architecture, represented generally by the bus 1224. The bus 1224 may include any number of interconnecting buses and bridges depending on the specific application of the processing system 1214 and the overall design constraints. The bus 1224 links together various circuits including one or more processors and/or hardware modules, represented by the processor 1222 the modules 1202, 1204, 1206, and the computer-readable medium 1226. The bus 1224 may also link various other circuits such as timing sources, peripherals, voltage regulators, and power management circuits, which are well known in the art, and therefore, will not be described any further.

The apparatus includes a processing system 1214 coupled to a transceiver 1230. The transceiver 1230 is coupled to one or more antennas 1220. The transceiver 1230 enables communicating with various other apparatus over a transmission medium. The processing system 1214 includes a processor 1222 coupled to a computer-readable medium 1226. The processor 1222 is responsible for general processing, including the execution of software stored on the computer-readable medium 1226. The software, when executed by the processor 1222, causes the processing system 1214 to perform the various functions described for any particular apparatus. The computer-readable medium 1226 may also be used for storing data that is manipulated by the processor 1222 when executing software.

The processing system 1214 includes a first detection module 1202 that detects a level of uncoordinated interference, a second detection module 1204 that detects a level of intra-RAT interference, and an interference module 1206 that initiates an intra-RAT interference solution based at least in part on the level of uncoordinated interference and/or the level of intra-RAT interference. The modules may be software modules running in the processor 1222, resident/stored in the computer-readable medium 1226, one or more hardware modules coupled to the processor 1222, or some combination thereof. The processing system 1214 may be a component of the UE 650 and may include the memory 660, the transmit processor 668, the receive processor 656, the modulators/demodulators 654a-r, the antenna 652a-r, and/or the controller/processor 659.

In one configuration, the UE 650 and/or base station 610 are configured for wireless communication including means for detecting. In one aspect, the detecting means may be the first detection module 1102/1202, the second detection module 1202/1204, the controller processor 659/675, memory 660/676, receive processor 656/670, transmitter/receiver 654/618, and/or antenna 652/620 configured to perform the functions recited by the detecting means. The UE 650 and/or base station 610 are also configured to include a means for implementing an intra-RAT interference solution. In one aspect, the implementing means may be the interference module 1106/1206 (described below), the controller processor 659/675, memory 660/676, receive processor 656/670, transmitter/receiver 654/618, and/or antenna 652/620 configured to perform the functions recited by the implementing means. In another aspect, the aforementioned means may be any module or any apparatus configured to perform the functions recited by the aforementioned means.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, the method comprising:
    detecting a level of uncoordinated interference;
    detecting a level of intra-RAT (radio access technology) interference; and
    implementing an intra-RAT interference solution based at least in part on the level of uncoordinated interference or the level of intra-RAT interference and based at least in part on a determination of a priority of a UE (user equipment), the determination of the priority based at least in part on a difference between the level of uncoordinated interference and the level of intra-RAT interference and an achieved throughput.

2. The method of claim 1, in which detecting the level of uncoordinated interference is based at least in part on a waveform of an interfering RAT.

3. The method of claim 1, in which detecting the level of uncoordinated interference is based at least in part on a temporal or frequency domain pattern of the interference.

4. The method of claim 1, further comprising adjusting an allowable interference level based at least in part on the level of uncoordinated interference or the level of intra-RAT interference.

5. The method of claim 1, in which implementing the intra-RAT interference solution further comprises initiating an intra-RAT interference solution, halting an intra-RAT interference solution or and/or modifying an intra-RAT interference solution.

6. An apparatus for wireless communication, comprising:
    means for detecting a level of uncoordinated interference;
    means for detecting a level of intra-RAT (radio access technology) interference; and
    means for implementing an intra-RAT interference solution based at least in part on the level of uncoordinated interference or the level of intra-RAT interference and based at least in part on a determination of a priority of a UE (user equipment), the determination of the priority based at least in part on a difference between the level of uncoordinated interference and the level of intra-RAT interference and an achieved throughput.

7. The apparatus of claim 6, in which the means for detecting the level of uncoordinated interference detects based at least in part on a waveform of an interfering RAT.

8. The apparatus of claim 6, in which the means for detecting the level of uncoordinated interference detects based at least in part on a temporal or frequency domain pattern of the interference.

9. The apparatus of claim 6, further comprising a means for adjusting an allowable interference level based at least in part on the level of uncoordinated interference or the level of intra-RAT interference.

10. A non-transitory computer-readable medium having non-transitory program code recorded thereon, the program code comprising:
    program code to detect a level of uncoordinated interference;
    program code to detect a level of intra-RAT (radio access technology) interference; and program code to implement an intra-RAT interference solution based at least in part on the level of uncoordinated interference or the level of intra-RAT interference and based at least in part on a determination of a priority of a UE (user equipment), the determination of the priority based at least in part on a difference between the level of uncoordinated interference and the level of intra-RAT interference and an achieved throughput.

11. The computer-readable medium of claim 10, in which the program code to detect the level of uncoordinated interference bases the detection at least in part on a waveform of an interfering RAT.

12. The computer-readable medium of claim 10, in which the program code to detect the level of uncoordinated interference bases the detection at least in part on a temporal or frequency domain pattern of the interference.

13. The computer-readable medium of claim 10, in which the program code further comprises program code to adjust an allowable interference level based at least in part on the level of uncoordinated interference or the level of intra-RAT interference.

14. An apparatus for wireless communication, comprising:
a memory; and
at least one processor coupled to the memory, the at least one processor being configured:
to detect a level of uncoordinated interference;
to detect a level of intra-RAT (radio access technology) interference; and
to implement an intra-RAT interference solution based at least in part on the level of uncoordinated interference or the level of intra-RAT interference and based at least in part on a determination of a priority of a UE (user equipment), the determination of the priority based at least in part on a difference between the level of uncoordinated interference and the level of intra-RAT interference and an achieved throughput.

15. The apparatus of claim 14, in which the at least one processor configured to detect a level of uncoordinated interference bases the detection at least in part on a waveform of an interfering RAT.

16. The apparatus of claim 14, in which the at least one processor configured to detect a level of uncoordinated interference bases the detection at least in part on a temporal or frequency domain pattern of the interference.

17. The apparatus of claim 14, in which the at least one processor is further configured to adjust an allowable interference level based at least in part on the level of uncoordinated interference or the level of intra-RAT interference.

18. The apparatus of claim 14, in which the at least one processor is further configured to implement by initiating an intra-RAT interference solution, halting an intra-RAT interference solution or modifying an intra-RAT interference solution.

* * * * *